(12) United States Patent
Hurtado (10) Patent No.: US 11,760,488 B2
(45) Date of Patent: Sep. 19, 2023

(54) SEAT ASSEMBLY HAVING INTEGRATED LIGHTING SYSTEM

(71) Applicant: THE BOEING COMPANY, Chicago, IL (US)

(72) Inventor: Joe Louis Hurtado, Easley, SC (US)

(73) Assignee: THE BOEING COMPANY, Chicago, IL (US)

( * ) Notice: Subject to any disclaimer, the term of this patent is extended or adjusted under 35 U.S.C. 154(b) by 59 days.

(21) Appl. No.: 17/522,066

(22) Filed: Nov. 9, 2021

(65) Prior Publication Data
US 2023/0145345 A1     May 11, 2023

(51) Int. Cl.
*B64D 11/00* (2006.01)
*B64D 11/06* (2006.01)

(52) U.S. Cl.
CPC ...... *B64D 11/0015* (2013.01); *B64D 11/0638* (2014.12)

(58) Field of Classification Search
CPC ............... A47C 7/725; B64D 11/0638; B64D 11/0015; B64D 11/00151; B64D 11/00152; B64D 2011/0053
USPC ..................................................... 297/217.6
See application file for complete search history.

(56) References Cited

U.S. PATENT DOCUMENTS

| | | | |
|---|---|---|---|
| 6,199,999 B1* | 3/2001 | Cotton, Jr. .......... | F21V 33/0012 297/445.1 |
| 10,065,741 B1* | 9/2018 | Pozzi ................. | B64D 11/0627 |
| 2001/0002092 A1* | 5/2001 | Reitze ............... | B60Q 3/57 297/217.6 |
| 2008/0136230 A1* | 6/2008 | Ling .................. | B64D 11/0638 297/217.6 |
| 2014/0292046 A1* | 10/2014 | Westerink ......... | B64D 11/06 297/217.3 |
| 2015/0259076 A1* | 9/2015 | Koyama ............ | B64D 11/00151 340/945 |
| 2016/0176337 A1* | 6/2016 | Kwak ................ | B60Q 3/76 297/217.6 |
| 2019/0328142 A1* | 10/2019 | Ma .................... | A47C 7/004 |
| 2020/0094985 A1* | 3/2020 | Quatmann ......... | B64D 11/00151 |
| 2020/0297119 A1* | 9/2020 | Nelson .............. | F21V 23/0485 |
| 2021/0393818 A1* | 12/2021 | Kanigowski ...... | A61L 2/10 |
| 2022/0055752 A1* | 2/2022 | Subramanian ..... | A61B 5/02055 |
| 2023/0059651 A1* | 2/2023 | Kodati .............. | B64D 11/0624 |

FOREIGN PATENT DOCUMENTS

| | | | | |
|---|---|---|---|---|
| EP | 3061465 | | 8/2016 | |
| EP | 3064401 | | 9/2016 | |
| EP | 3546355 A1 | * | 10/2019 | ............ B64D 11/00 |
| GB | 2410854 A | * | 8/2005 | ....... B64D 11/00151 |

OTHER PUBLICATIONS

Extended European Search Report for EP 22206126.9-1004, dated Mar. 13, 2023.

* cited by examiner

*Primary Examiner* — Jose V Chen
(74) *Attorney, Agent, or Firm* — The Small Patent Law Group LLC; Joseph M. Butscher (57) ABSTRACT

A seat assembly for an internal cabin of a vehicle includes a backrest, and a lighting system coupled to the backrest. A method of forming a seat assembly for an internal cabin of a vehicle includes coupling a lighting system to a backrest.

20 Claims, 6 Drawing Sheets

FIG. 9

SEAT ASSEMBLY HAVING INTEGRATED LIGHTING SYSTEM

FIELD OF THE DISCLOSURE

Examples of the present disclosure generally relate to seat assemblies, such as within an internal cabin of a vehicle, and more particularly to seat assemblies having integrated lighting systems.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like.

A typical seat assembly within an internal cabin of an aircraft includes a tray table on a rear portion. The tray table is configured to be selectively stowed and deployed by a passenger seated on another seat assembly behind the seat assembly. Certain seat assemblies also include a monitor above the tray table, as well as a literature pocket below the tray table.

Reading lights for passengers are typically located above a seat assembly. For example, a reading light is often disposed within a passenger service unit (PSU) above the seat assembly. Due to the location of the reading light above the seat assembly and proximate to a stowage bin, a passenger generally extends a full length of an arm to reach and engage a switch for the reading light. However, certain smaller individuals may have difficulty reaching the switch, particularly when seated.

Additionally, because the reading light is located above the seat assembly, the light element typically requires a voltage and brightness sufficient to illuminate an area that allows an individual to comfortably and easily read. As can be appreciated, the farther away the reading light, the higher the voltage and brightness that are typically required.

Also, the elevated location of the reading light away from the passenger increases the amount of wiring, such as within the PSU, thereby increasing weight, cost, and complexity.

SUMMARY OF THE DISCLOSURE

A need exists for an efficient and effective system and method for illuminating a volume of space within an internal cabin. Further, a need exists for a lighting system within an internal cabin that is easily reachable by passengers. Additionally, a need exists for a lighting system within an internal cabin that draws a reduced amount of power.

With those needs in mind, certain examples of the present disclosure provide a seat assembly for an internal cabin of a vehicle. The seat assembly includes a backrest, and a lighting system coupled to the backrest. In at least one example, the lighting system is secured to an aft portion of the backrest. The seat assembly can also include a tray table configured to move between a stowed position and a deployed position.

In at least one example, the lighting system includes a housing, one or more lamps within the housing, and a cover secured to the housing. The one or more lamps are behind the cover. As a further example, the one or more lamps include a reading lamp configured to emit reading light. As a further example, the one or more lamps also include an ultraviolet (UV) lamp configured to emit UV light.

In at least one example, the seat assembly also include an outer seatback shroud. The housing is secured to the outer seatback shroud. As a further example, the outer seatback shroud includes a bezel. The housing is removably secured to the bezel.

In at least one example, the seat assembly also includes a control switch coupled to the backrest. The control switch is configured to be engaged to selectively activate and deactivate at least a portion of the lighting system.

Certain examples of the present disclosure provide a method of forming a seat assembly for an internal cabin of a vehicle. The method includes coupling a lighting system to a backrest. In at least one example, said coupling includes securing the lighting system to an aft portion of the backrest. In at least one example, the method also includes coupling a control switch to the backrest, wherein the control switch is configured to be engaged to selectively activate and deactivate at least a portion of the lighting system.

Certain examples of the present disclosure provide a vehicle including an internal cabin, and a seat assembly within the internal cabin, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a lighting system for an internal cabin of a vehicle, such as a commercial aircraft. The lighting system is disposed within a backrest of a seat assembly in the front of a passenger, which provides an improved quality reading light experience for the passenger, and places the accessibility of the light controls easily within reach of an arm of an individual. In comparison, the control switch for the lighting system can be placed within a short distance from the passenger (such as 5 inches away on the seat backrest). In at least one example, the lighting system also includes an ultraviolet (UV) light element (such as one or more UV light bulbs) that are configured to provide a germicidal lamp, which can be used to sanitize a surface of a tray table.

As described herein, examples of the present disclosure dispose a reading light and switch configured to control the reading light within easy reach of a passenger (in contrast to known reading lights that are above a seat assembly and a relatively far distance away from the passenger). Accordingly, the passenger has immediate and full control of the reading lighting within a personal space. Also, the passenger benefits from direct lighting directed onto personal space, which provides higher quality and more direct lighting to the passenger.

As noted, the lighting system can also include a UV light element that is configured to sanitize one or more surfaces, such as of a tray table, armrests of a seat assembly, and/or the like. The UV light element can be in communication with a control unit that is configured to control operation thereof. The UV light element can be activated by attendants or other crew after passengers have left the internal cabin.

Certain examples of the present disclosure provide a seat assembly having a seatback and a lighting system coupled to the seatback. In at least one example, the lighting system includes a removable housing supporting a reading lamp including one or more light elements (such as one or more bulbs, light emitting diodes, and/or the like configured to emit white light), and a UV lamp including one or more light elements (such as one or more UV light bulbs, light emitting diodes, and/or the like). The reading lamp is operable by a passenger to direct light toward the passenger and/or a tray table. The UV lamp is operable by the crew for disinfection of the air and surface around the passenger seating area. Disposing the UV lamp closer to the passenger seating area can reduce the power supply requirements (as compared to the UV lamp being overhead or somewhere else). In at least one example, the removable housing can include apertures formed to direct the reading light and UV light to desired areas, such as the tray table or arm rests when deployed. In at least one example, either or both lights can turn on automatically when the tray table is deployed.

Figure 1:
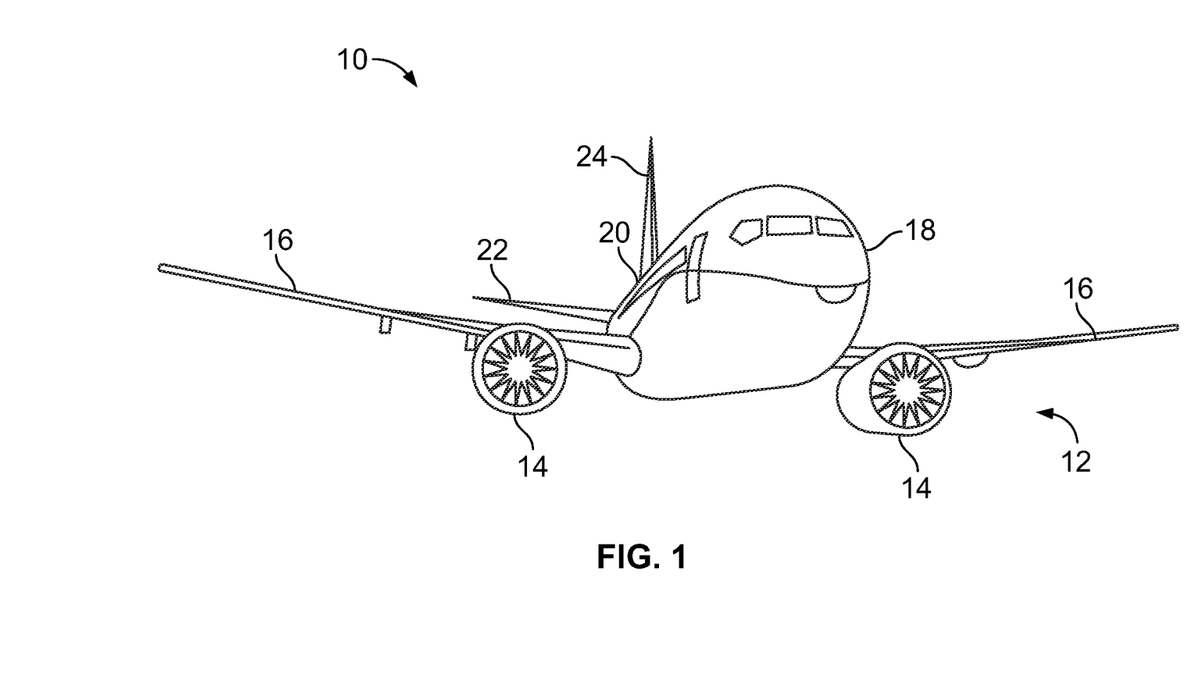
FIG. 1 illustrates a perspective front view of an aircraft, according to an example of the present disclosure.

FIG. 1 illustrates a perspective top view of a vehicle, such as an aircraft 10, according to an embodiment of the present disclosure. The aircraft 10 includes a propulsion system 12 that may include two engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
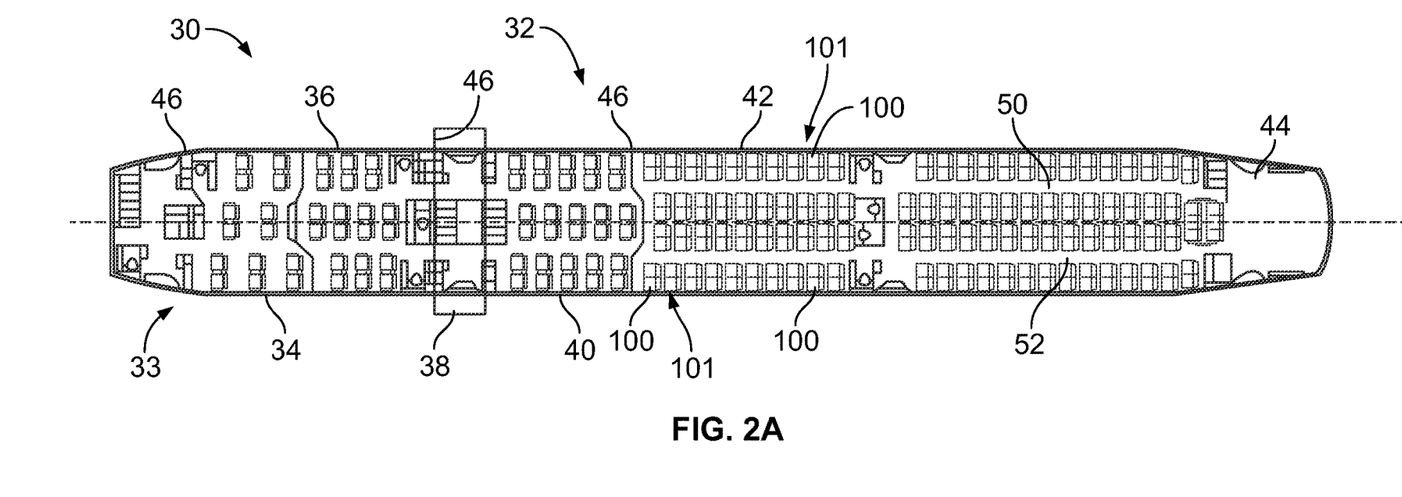
FIG. 2A illustrates a top plan view of an internal cabin of an aircraft.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101.

Figure 2B:
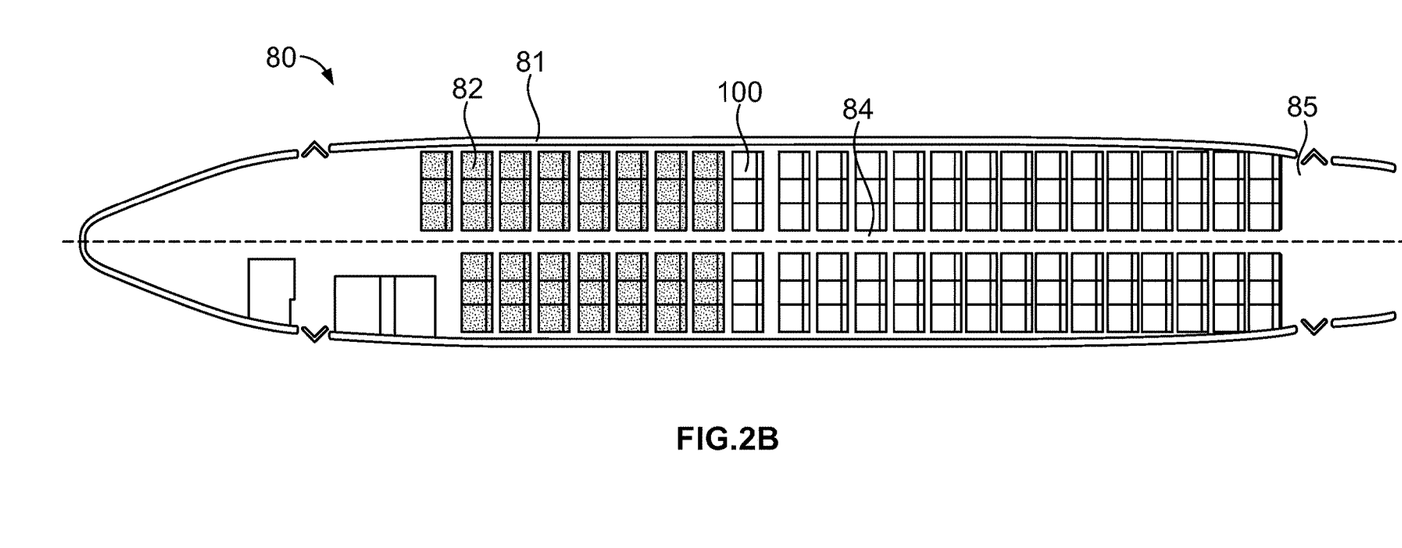
FIG. 2B illustrates a top plan view of an internal cabin of an aircraft.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
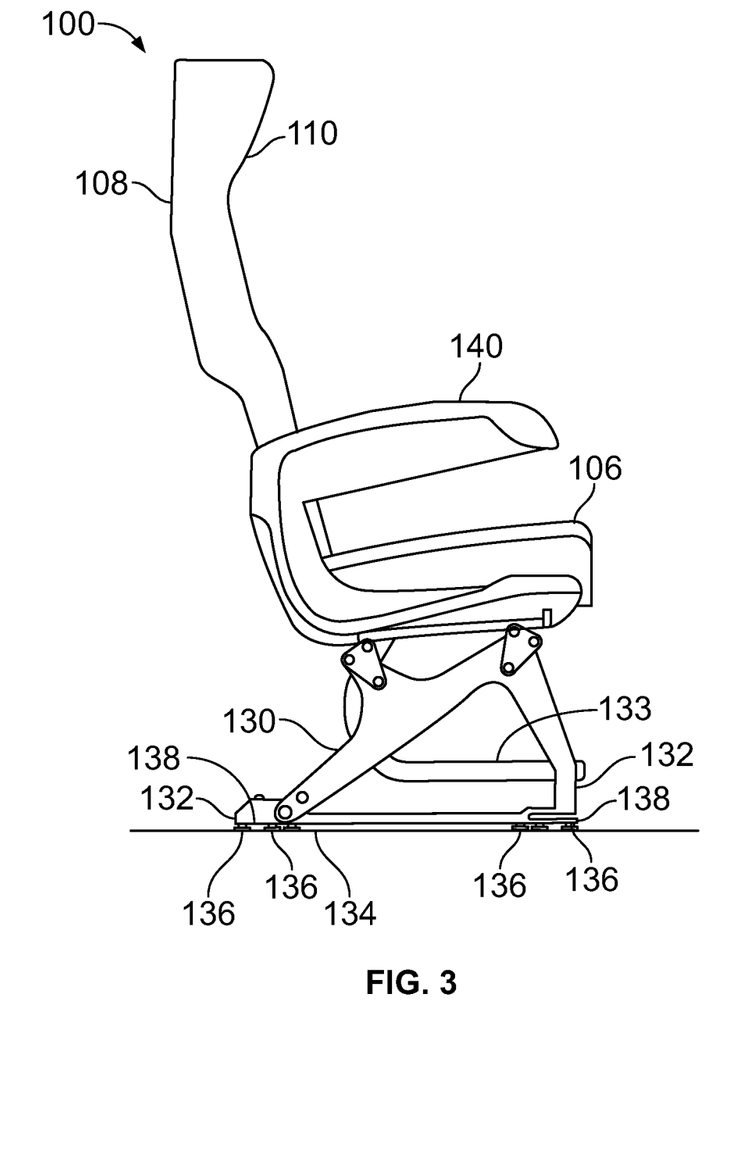
FIG. 3 illustrates a side view of a seat assembly, according to an example of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. The legs 132 on a same side of the seat assembly 100 may be connected together by a spanner bar 133. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

The seat assembly 100 may be coupled together with one or more additional seat assemblies to form a seating module. For example, a seating module may include three seat assemblies. The seating module may include a base that supports all of the seat assemblies of the seating module.

Figure 4:
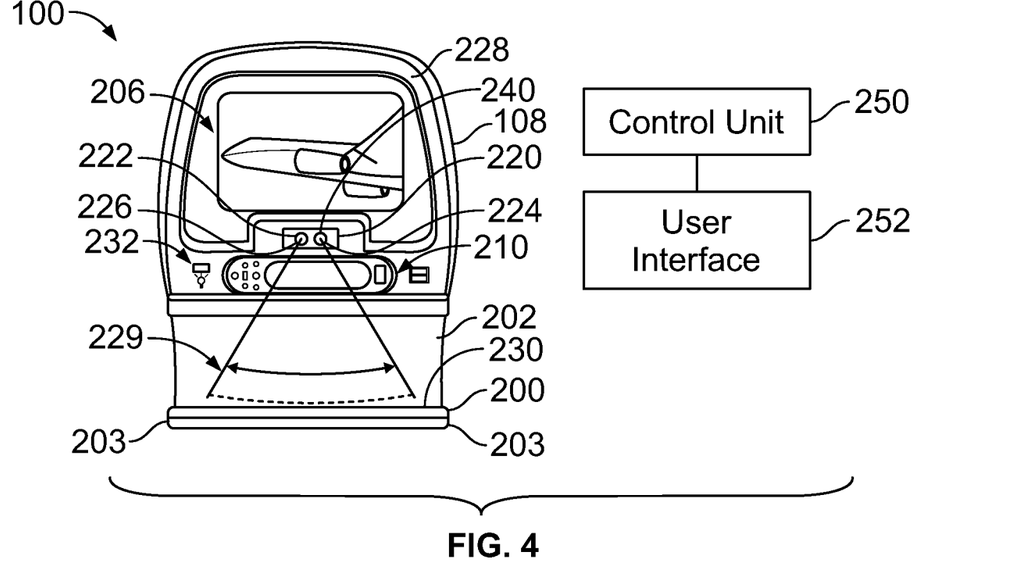
FIG. 4 illustrates a rear view of the seat assembly, according to an example of the present disclosure.
Figure 5:
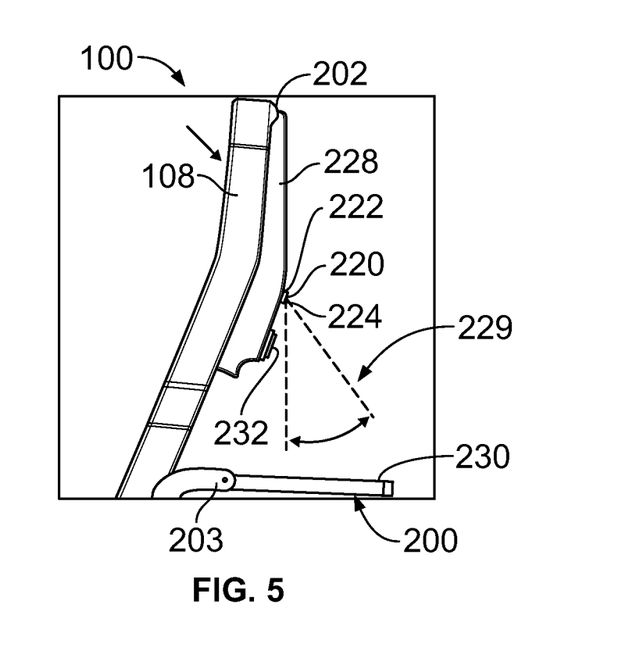
FIG. 5 illustrates a lateral view of the seat assembly of FIG. 4.

FIG. 4 illustrates a rear view of the seat assembly 100 having a tray table 200 in a deployed position, according to an example of the present disclosure. FIG. 5 illustrates a lateral view of the seat assembly 100 of FIG. 4. Referring to FIGS. 4 and 5, the tray table 200 is pivotally coupled to an aft portion 202 (for example, a back portion or seatback) of the backrest 108, such as via lateral pivot brackets 203.

A component, such as a monitor 206, is coupled to (for example, secured to and/or integrally formed with) an upper portion of the aft portion 202 above the tray table 200. Optionally, the component may be a padded area (such as forward head rest), a device mount (that is configured to support a device, such as a handheld smart phone or table), and/or the like. In at least one example, the component 206 is an infotainment unit, which can include a video monitor, touchscreen interface, and/or the like. Optionally, the seat assembly 100 may not include the component 206.

The seat assembly 100 can also include a handset 210 above the tray table 200, and below the component 206. The handset 210 can be used to make telephone calls, provide inputs in relation to the component 206, and/or the like. Optionally, the seat assembly 100 may not include the handset 210.

The seat assembly 100 includes a lighting system 220 disposed within the aft portion 202, such as the seatback. In at least one example, the lighting system 220 includes a housing 222 having a transparent cover 224 (such as a lens) disposed over a reading lamp 226 (that is, the reading lamp 226 is disposed behind the cover 224). In at least one example, the housing 222 is mounted to an outer seatback shroud 228 of the seat assembly 100. The reading lamp 226 includes one or more light elements, such as one or more bulbs, light emitting diodes (LEDs), and/or the like that are configured to emit reading light (such as white light) into a designated area 229 onto and above an upper surface 230 of the tray table 200.

As shown, the lighting system 220 can be disposed above the tray table 200 proximate to a central section of the aft portion 202 of the seat assembly 100. Optionally, the lighting system 220 can be disposed at various other areas, such as closer to a side of the aft portion 202.

A control switch 232 (such as an ON/OFF switch) is also coupled to the outer seatback shroud 228. The control switch 232 is mounted to the aft portion 202 of the seat assembly 100. The control switch 232 is in communication with the reading lamp 226, such as through one or more wired or wireless connections. The control switch 232 allows an individual to selectively activate and deactivate the reading lamp 226 of the lighting system 220. Because the control switch 232 is coupled to the aft portion 202 of the seat assembly 100, an individual seated in a seat assembly behind the seat assembly 100 can easily reach and engage the switch 232 to selectively activate and deactivate the reading lamp 226. Optionally, the control switch 232 can be at various other locations of the seat assembly 100 than shown. For example, the control switch 232 can be disposed on an arm rest of a seat assembly that is disposed behind the seat assembly 100.

In at least one example, the lighting system 220 also includes a UV lamp 240 disposed behind the cover 224 (that is, the UV lamp 240 is disposed behind the cover 224). The UV lamp 240 is configured to emit UV light into and through a volume of space, such as an area behind the aft portion 202, onto the surface 230 of the tray table, onto arm rests and/or a seat cushion of a seat assembly behind the seat assembly 100, and/or the like. The UV lamp 240 is configured to sanitize the various volumes of spaced and/or surfaces via the emitted UV light.

As an example, the UV lamp 240 is configured to emit the UV light having a wavelength between 200 nm-230 nm. As a further example, the UV lamp is configured to emit the UV having a wavelength of 222 nm. As another example, the UV lamp is configured to emit the UV light having a wavelength between 230 nm-280 nm. As a further example, the UV lamp is configured to emit the UV light having a wavelength of 254 nm.

In at least one example, the reading lamp 226 and the UV lamp 240 can be connected to a control system (such as can include a control unit) within the aircraft, such as by one or more wired or wireless connections. The reading lamp 226 and the UV lamp 240 can be controlled by the control system based on power availability, passenger loads, flight phase (for example, ground, taxi, takeoff, cruise, landing), and/or the like.

In at least one example, the UV lamp 240 is in communication with a control unit 250, such as through one or more wired or wireless connections. The control unit 250 can be part of a central workstation, such as within a flight deck, galley, or the like within a commercial aircraft. The control unit 250 is configured to be operated by vehicle personnel, thereby precluding passengers from operating the UV lamp 240. As an example, a crew member of a vehicle operates the UV lamps 240 of seat assemblies 100 to sanitize surfaces, spaces, and the like within an internal cabin when passengers are no longer in the internal cabin. The control unit 250 can be in communication with a user interface 252 (such as can include a display, keyboard, mouse, touchscreen interface, and/or the like) that allows the crew member to selectively activate and deactivate the UV lamp(s) 240 of one or more seat assemblies 100 via the control unit 250.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 250 may be or include one or more processors that are configured to control operation, as described herein.

The control unit 250 is configured to execute a set of instructions that are stored in one or more data storage units or elements (such as one or more memories), in order to process data. For example, the control unit 250 may include or be coupled to one or more memories. The data storage units may also store data or other information as desired or needed. The data storage units may be in the form of an information source or a physical memory element within a processing machine.

The set of instructions may include various commands that instruct the control unit 250 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 250. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 250 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Optionally, the UV lamp 240 can be in communication with the control switch 232, such as via one or more wired or wireless connections. In this manner, the UV lamp 240 can be controlled by a seated passenger, such as if the UV lamp 240 is configured to emit light at 222 nm. Optionally, the UV lamp 240 is not in communication with a control unit, such as the control unit 250.

Alternatively, the lighting system 220 may not include the UV lamp 240. In this manner, the passenger can selectively activate and deactivate both the reading lamp 226 and/or the UV lamp 240, as desired. In at least one example, both the reading lamp 226 and the UV lamp 240 can be concurrently active.

Alternatively, the lighting system 220 may not include the UV lamp 240. For example, the lighting system 220 may include the reading lamp 226, but not the UV lamp 240.

As described herein, the seat assembly 100 for an internal cabin of a vehicle includes the backrest 108, and the lighting system 220 coupled to the backrest 108. In at least one example, the lighting system 220 is secured to the aft portion 202 of the backrest 108. The seat assembly can also include the tray table 200, which is configured to move between a stowed position and a deployed position.

In at least one example, the lighting system 220 includes the housing 222, one or more lamps within the housing 222, and the cover 224 secured to the housing 222. The lamp(s) are behind the cover 224. In at least one example, the one or more lamps include the reading lamp 226 configured to emit reading light (for example, soft white light). In at least one example, the one or more lamps further include the UV lamp 240 configured to emit UV light.

In at least one example, the housing 222 is secured to the outer seatback shroud 228. For example, the outer seatback shroud 228 includes a bezel, and the housing 222 is removably secured to the bezel.

In at least one example, the seat assembly 100 also includes the control switch 232 coupled to the backrest 108. The control switch 232 is configured to be engaged to selectively activate and deactivate at least a portion of the lighting system 220 (such as one or more lamps of the lighting system 220).

In at least one example, a method of forming the seat assembly 100 includes coupling the lighting system 220 to the backrest 108. For example, said coupling includes securing the lighting system 220 to the aft portion 202 of the backrest 108. The method can also include moveably coupling the tray table 200 to a portion of the seat assembly 100.

Figure 6:
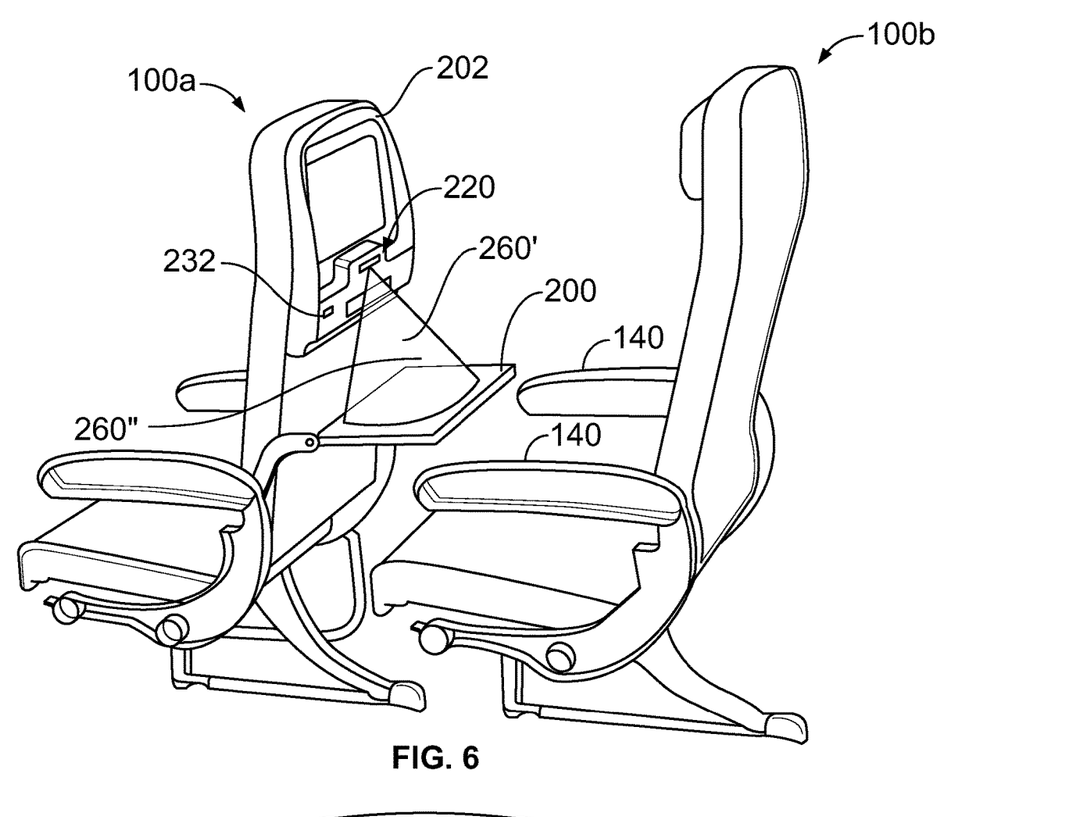
FIG. 6 illustrates a perspective lateral view of a seat assembly in front of another seat assembly, according to an example of the present disclosure.

FIG. 6 illustrates a perspective lateral view of a seat assembly 100*a* in front of another seat assembly 100*b*, according to an example of the present disclosure. Referring to FIGS. 4-6, a passenger seated in the seat assembly 100*b* can selectively move the tray table 200 of the seat assembly 100*a* between a stowed position and a deployed position (as shown in FIG. 6). The passenger seated in the seat assembly 100*b* can further selectively engage the control switch 232 disposed in the aft portion 202 of the seat assembly 100*a* to selectively activate and deactivate the reading lamp 226 of the lighting system 220 to emit reading light 260' (such as soft white light) into the area 229, which extends over the upper surface 230 of the tray table 200 in the deployed position. Additionally, the UV lamp 240 can be selectively activated, such as via the control unit 250, to emit sanitizing UV light 260" into the area 229, which sanitizes the volume of space of the area 229, the upper surface 230 of the tray table 200, arm rests 140 of the seat assembly 100*b*, and/or the like.

Figure 7:
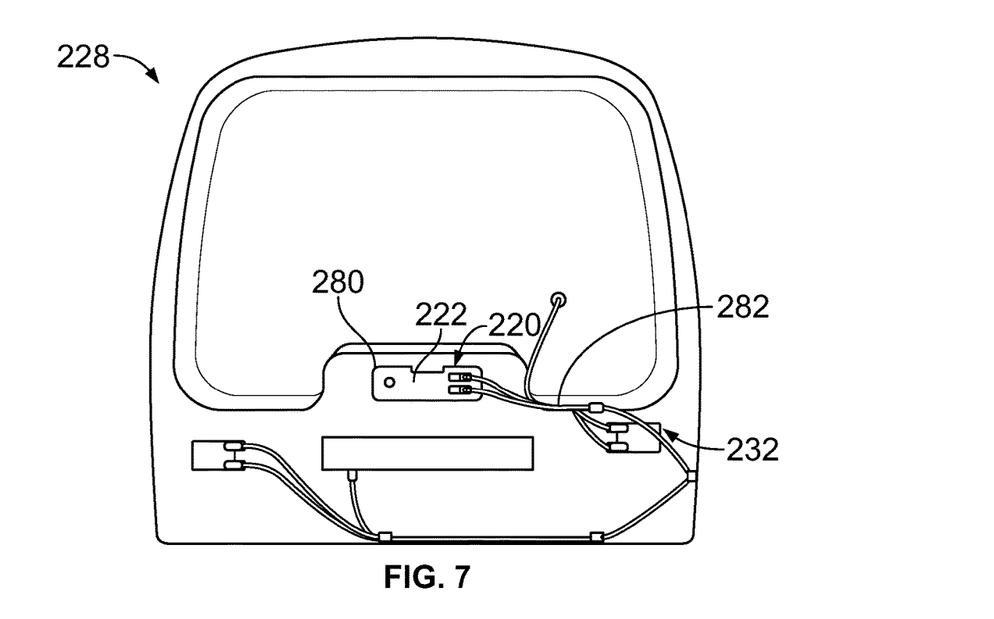
FIG. 7 illustrates a rear internal view of an outer seatback shroud, according to an example of the present disclosure.

FIG. 7 illustrates a rear internal view of the outer seatback shroud 228, according to an example of the present disclosure. Referring to FIGS. 4-7, the outer seatback shroud 228 secures to the aft portion 202 of the seat assembly 100. For the sake of clarity, the rear view shown in FIG. 7 is the portion that faces away from a passenger seated in the seat assembly 100*b* (shown in FIG. 6).

In at least one embodiment, the housing 222 of the lighting system 220 is removably mounted within a bezel 280 of the outer seatback shroud 228. The control switch 232 is also mounted to the seatback cover 228. The control switch 232 can be in communication with the lighting system 220 through wiring 282.

Figure 8:
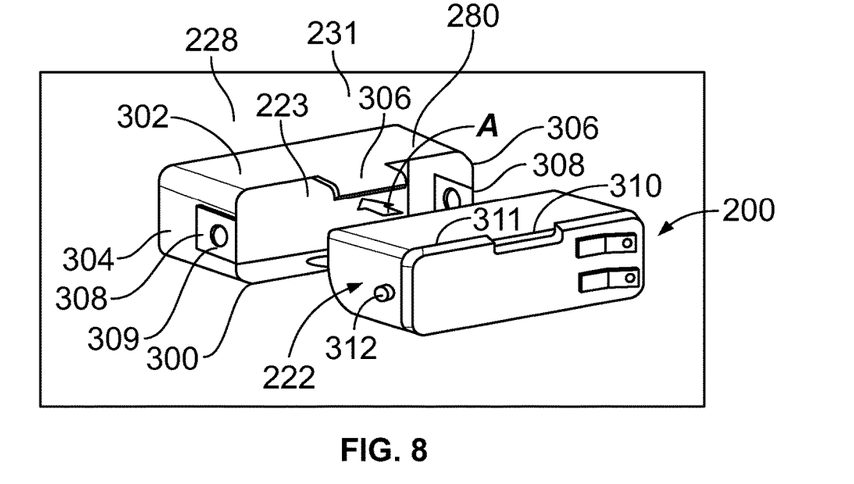
FIG. 8 illustrates a perspective rear internal view of a lighting system separated from a bezel of an outer seatback shroud, according to an example of the present disclosure.

FIG. 8 illustrates a perspective rear internal view of the lighting system 220 separated from the bezel 280 of the outer seatback shroud 228, according to an example of the present disclosure. The bezel 280 rearwardly extends from a rear surface 231 of the outer seatback shroud 228. The bezel 280 includes a lower wall 300 connected to an upper wall 302 by lateral walls 304 and 306. One or both of the upper wall 302 and/or the lower wall 302 includes a deflectable clip 306. The lateral walls 304 include deflectable tabs 308 having openings 309.

The housing 222 of the lighting system 220 is configured to be removably coupled to the bezel 280. For example, upper rear portions 311 include recesses 310 into which a deflectable clip 306 is configured to snapably secure. Further, sides of the housing 222 include protuberances 312 (such as posts, studs, snaps, or the like) that are configured to snapably secure into the openings 309 of the deflectable tabs 308. The housing 222 is moved into the central chamber 233 of the bezel 280 in the direction of arrow A. As the housing 222 is urged into the central chamber 233, the deflectable clips 306 and the tabs 308 outwardly deflect and resiliently inwardly deflect to snapably secure the housing 222 within the bezel 280. In this manner, the lighting system 220 can be secured to the outer seatback shroud 228 without the use of separate and distinct fasteners.

Optionally, the lighting system 230 can be secured to the outer seatback shroud 228 in various ways other than the bezel 280. For example, the lighting system 230 can be secured to proximate to an opening of the outer seatback shroud 228 through one or more fasteners, adhesives, and/or the like.

Figure 9:
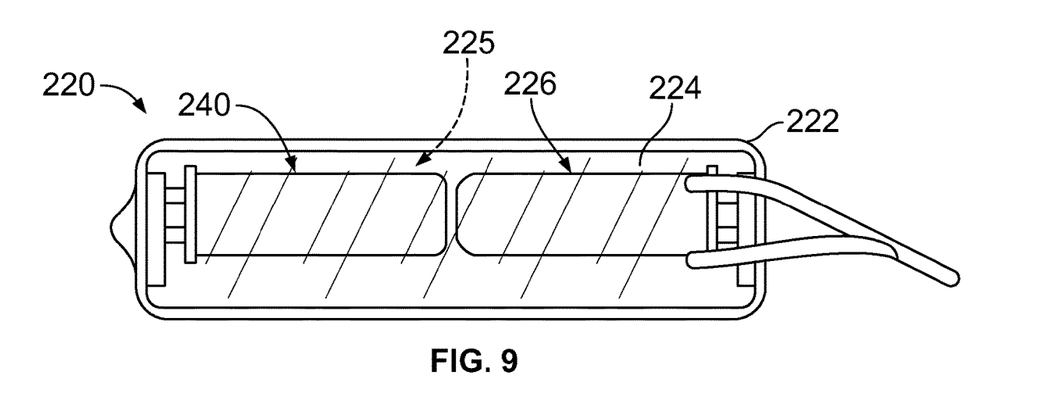
FIG. 9 illustrates a front view of the lighting system, according to an example of the present disclosure.

FIG. 9 illustrates a front view of the lighting system 220, according to an example of the present disclosure. The reading lamp 226 and the UV lamp 240 are disposed within an internal chamber 225 of the housing 222 behind the cover 224 (such as a lens). The positions of the reading lamp 226 and the UV lamp 240 can be switched. Also, alternatively, the lighting system 220 may not include the UV lamp 240.

Referring to FIGS. 4-9, the seat assembly 100 includes the lighting system 220, such as disposed within the aft portion 202. By disposing the lighting system 220 within the seat assembly 100, passengers can readily and easily reach the control switch 232 and operate the lighting system 220. Further, the reading lamp 226 is closer to a reading area, thereby providing an improved reading experience (as well as requiring less power than if further away, such above the seat assembly 100 within a PSU). The lighting system 220 can be integrated into the seat assembly 100 using the same wiring used for the component 206 (such as the infotainment unit), thereby reducing complexity. It has been found that the lighting system 220 reduces overall weight and costs as compared to standard PSU lighting.

Further, the disclosure comprises examples according to the following clauses:

Clause 1. A seat assembly for an internal cabin of a vehicle, the seat assembly comprising:
a backrest; and
a lighting system coupled to the backrest.

Clause 2. The seat assembly of Clause 1, wherein the lighting system is secured to an aft portion of the backrest.

Clause 3. The seat assembly of Clauses 1 or 2, further comprising a tray table configured to move between a stowed position and a deployed position.

Clause 4. The seat assembly of any of Clauses 1-3, wherein the lighting system comprises:
a housing;
one or more lamps within the housing; and
a cover secured to the housing, wherein the one or more lamps are behind the cover.

Clause 5. The seat assembly of Clause 4, wherein the one or more lamps comprises a reading lamp configured to emit reading light.

Clause 6. The seat assembly of Clause 5, wherein the one or more lamps further comprises an ultraviolet (UV) lamp configured to emit UV light.

Clause 7. The seat assembly of any of Clauses 1-6, further comprising an outer seatback shroud, wherein the housing is secured to the outer seatback shroud.

Clause 8. The seat assembly of Clause 7, wherein the outer seatback shroud comprises a bezel, and wherein the housing is removably secured to the bezel.

Clause 9. The seat assembly of any of Clauses 1-8, further comprising a control switch coupled to the backrest, wherein the control switch is configured to be engaged to selectively activate and deactivate at least a portion of the lighting system.

Clause 10. A method of forming a seat assembly for an internal cabin of a vehicle, the method comprising:
coupling a lighting system to a backrest.

Clause 11. The method of Clause 10, wherein said coupling comprises securing the lighting system to an aft portion of the backrest.

Clause 12. The method of Clauses 10 or 11, further comprising moveably coupling a tray table to a portion of the seat assembly.

Clause 13. The method of any of Clauses 10-12, wherein the lighting system comprises:
a housing;
one or more lamps within the housing; and
a cover secured to the housing, wherein the one or more lamps are behind the cover.

Clause 14. The method of Clause 13, wherein the one or more lamps comprise:
a reading lamp configured to emit reading light; and
an ultraviolet (UV) lamp configured to emit UV light.

Clause 15. The method of Clauses 13 or 14, wherein said coupling comprises securing the housing to an outer seatback shroud of the seat assembly.

Clause 16. The method of Clause 15, wherein the outer seatback shroud comprises a bezel, and wherein said securing comprises removably securing the housing to the bezel.

Clause 17. The method of any of Clauses 10-16, further comprising coupling a control switch to the backrest, wherein the control switch is configured to be engaged to selectively activate and deactivate at least a portion of the lighting system.

Claims 18. A vehicle comprising:
an internal cabin; and
a seat assembly within the internal cabin, the seat assembly comprising:
a backrest comprising an aft portion having an outer seatback shroud, wherein the outer seatback shroud includes a bezel;
a lighting system coupled secured removably secured to the bezel of the outer seatback shroud, wherein the lighting system comprises a housing; a reading lamp within the housing, wherein the reading lamp is configured to emit reading light; an ultraviolet (UV) lamp within the housing, wherein the UV lamp is configured to emit UV light; and a cover secured to the housing, wherein the reading lamp and the UV lamp are behind the cover;
a control switch coupled to the outer seatback shroud, wherein the control switch is configured to be engaged to selectively activate and deactivate the reading lamp; and
a tray table configured to move between a stowed position and a deployed position.

As described herein, examples of the present disclosure provide efficient and effective systems and methods for illuminating a volume of space within an internal cabin. Further, examples of the present disclosure provide lighting systems within an internal cabin that are easily reachable by passengers. Additionally, examples of the present disclosure provide lighting systems within an internal cabin that draw a reduced amount of power as compared to overhead reading lights.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly for an internal cabin of a vehicle, the seat assembly comprising:
    a backrest having an outer seatback shroud; and
    a lighting system comprising a housing mounted to the outer seatback shroud, wherein the outer seatback shroud comprises a bezel, and wherein the housing is removably secured to the bezel,
    wherein the bezel rearwardly extends from a rear surface of the outer seatback shroud, wherein the bezel comprises a lower wall connected to an upper wall by lateral walls, wherein one or both of the upper wall or the lower wall comprises a deflectable clip, wherein the lateral walls comprise deflectable tabs having openings, and wherein the deflectable clip and the deflectable tabs are configured to deflect to secure the housing within the bezel.

2. The seat assembly of claim 1, wherein the housing of the lighting system is secured to an aft portion of the outer seatback shroud.

3. The seat assembly of claim 1, further comprising a tray table configured to move between a stowed position and a deployed position.

4. The seat assembly of claim 1, wherein the lighting system further comprises:
    one or more lamps within the housing; and
    a cover secured to the housing, wherein the one or more lamps are behind the cover.

5. The seat assembly of claim 4, wherein the one or more lamps comprises a reading lamp configured to emit reading light.

6. The seat assembly of claim 5, wherein the one or more lamps further comprises an ultraviolet (UV) lamp configured to emit UV light.

7. The seat assembly of claim 6, wherein the reading lamp and the UV lamp are disposed within an internal chamber of the housing behind the cover.

8. The seat assembly of claim 1, further comprising a control switch coupled to the backrest, wherein the control switch is configured to be engaged to selectively activate and deactivate at least a portion of the lighting system.

9. The seat assembly of claim 1, wherein the housing comprises:
    upper rear portions having one or more recesses into which the deflectable clip is configured to secure; and
    protuberances on sides configured to secure into the openings of the deflectable tabs.

10. The seat assembly of claim 1, further comprising a monitor coupled to an aft portion of the backrest.

11. A method of forming a seat assembly for an internal cabin of a vehicle, the method comprising:
    mounting a housing of a lighting system to an outer seatback shroud of a backrest, wherein the outer seatback shroud comprises a bezel, and wherein the housing is removably secured to the bezel,
    wherein the bezel rearwardly extends from a rear surface of the outer seatback shroud, wherein the bezel comprises a lower wall connected to an upper wall by lateral walls, wherein one or both of the upper wall or the lower wall comprises a deflectable clip, wherein the lateral walls comprise deflectable tabs having openings, and wherein the deflectable clip and the deflectable tabs are configured to deflect to secure the housing within the bezel.

12. The method of claim 11, wherein said mounting comprises securing the lighting system to an aft portion of the outer seatback shroud of the backrest.

13. The method of claim 11, further comprising moveably coupling a tray table to a portion of the seat assembly.

14. The method of claim 11, wherein the lighting system comprises:
one or more lamps within the housing; and
a cover secured to the housing, wherein the one or more lamps are behind the cover.

15. The method of claim 13, wherein the one or more lamps comprise:
a reading lamp configured to emit reading light; and
an ultraviolet (UV) lamp configured to emit UV light.

16. The method of claim 11, further comprising coupling a control switch to the backrest, wherein the control switch is configured to be engaged to selectively activate and deactivate at least a portion of the lighting system.

17. The method of claim 11, wherein the housing comprises:
upper rear portions having one or more recesses into which the deflectable clip is configured to secure; and
protuberances on sides configured to secure into the openings of the deflectable tabs.

18. A vehicle comprising:
an internal cabin; and
a seat assembly within the internal cabin, the seat assembly comprising:
a backrest comprising an aft portion having an outer seatback shroud, wherein the outer seatback shroud includes a bezel, wherein the bezel rearwardly extends from a rear surface of the outer seatback shroud, wherein the bezel comprises a lower wall connected to an upper wall by lateral walls, wherein one or both of the upper wall or the lower wall comprises a deflectable clip, wherein the lateral walls comprise deflectable tabs having openings;
a lighting system removably secured to the bezel of the outer seatback shroud, wherein the lighting system comprises a housing; a reading lamp within the housing, wherein the reading lamp is configured to emit reading light; an ultraviolet (UV) lamp within the housing, wherein the UV lamp is configured to emit UV light; and a cover secured to the housing, wherein the reading lamp and the UV lamp are behind the cover, and wherein the deflectable clip and the deflectable tabs are configured to deflect to secure the housing within the bezel;
a control switch coupled to the outer seatback shroud, wherein the control switch is configured to be engaged to selectively activate and deactivate the reading lamp; and
a tray table configured to move between a stowed position and a deployed position.

19. The seat assembly of claim 18, wherein the housing comprises:
upper rear portions having one or more recesses into which the deflectable clip is configured to secure; and
protuberances on sides configured to secure into the openings of the deflectable tabs.

20. The seat assembly of claim 18, further comprising a monitor coupled to an aft portion of the backrest.

* * * * *